Nov. 25, 1924.
H. L. DECKER
1,516,762
METHOD OF ASSEMBLING NUTS AND CASE MEMBERS
Filed April 27, 1922
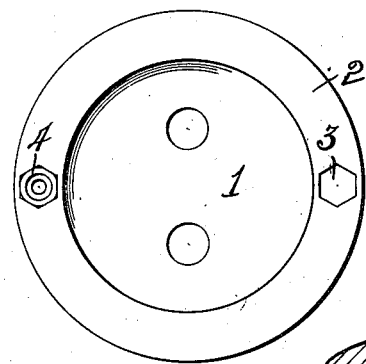
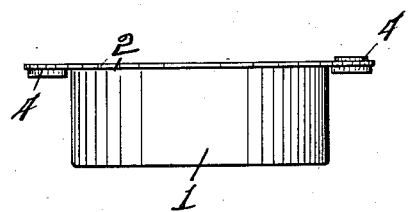
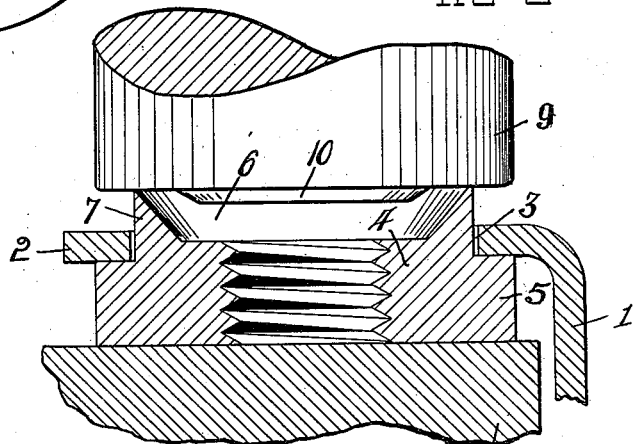
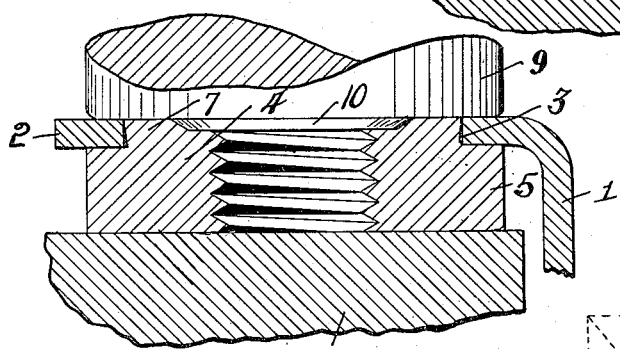
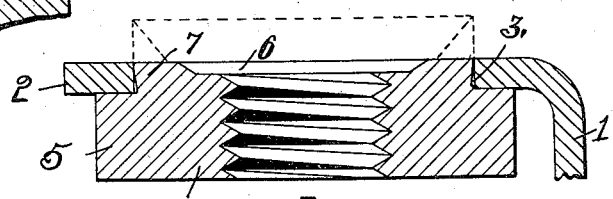
INVENTOR
Hugh L. Decker,
By Owen Owen & Crampton.
Attys.

Patented Nov. 25, 1924.

1,516,762

UNITED STATES PATENT OFFICE.

HUGH L. DECKER, OF TOLEDO, OHIO, ASSIGNOR TO THE W. G. NAGEL ELECTRIC COMPANY, OF TOLEDO, OHIO, A CORPORATION OF OHIO.

METHOD OF ASSEMBLING NUTS AND CASE MEMBERS.

Application filed April 27, 1922. Serial No. 556,826.

*To all whom it may concern:*

Be it known that I, HUGH L. DECKER, a citizen of the United States, and a resident of Toledo, in the county of Lucas and State of Ohio, have made an Invention Appertaining to a Method of Assembling Nuts and Case Members; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

In the automotive art it is the practice to mount ammeters and sometimes pressure gauges in flanged cup-like sheet metal cases and to secure the flanged open ends of the cases to the instrument boards by inserting flanged nut members loosely in openings in the case flanges and projecting screws through openings in the instrument boards and threading them into the nuts. This method is objectionable for the reason that the nut members are not permanently attached to the case and therefore become lost and misplaced, and also for the reason that it is difficult to attach a case to an instrument board or other carrying means as it is necessary to hold the nuts in position as well as the case when mounting same.

The primary object of the invention is the provision of a simple, efficient and economical method for securing nut members in the case openings provided therefor, whereby to retain the parts together and facilitate mounting the cases.

The invention is fully described in the following specification, and while it is capable of being practiced in numerous ways, a preferred method of practicing the same is illustrated in the accompanying drawings in which,—

Figure 1 is an end view of a case having a nut member secured in one flange opening thereof. Fig. 2 is a side view of the case with a nut member firmly secured in one flange opening thereof and with another nut member loosely positioned in another flange opening thereof preparatory to being compressed to firmly engage it to the flange. Fig. 3 is an enlarged fragmentary sectional detail of a case with a nut in central longitudinal section in position to have a compressing force applied thereto. Fig. 4 is a similar view with the compressing parts at the limit of their inward relative compressing movements, and Fig. 5 is a similar view of the case and nut member secured together with the original dotted line position of the nut member edge wall shown in dotted lines.

Referring to the drawings, 1 designates an ammeter or gauge enclosing case, which is usually of sheet metal and has the customary annular outwardly projecting edge flange 2 at its open end, the flange being provided at spaced intervals therearound with holes 3, each intended to receive a nut 4. The holes are usually and preferably hexagonal or of other polygonal form in the cross-section.

The nuts 4 are preferably of cylindrical form in cross-section and of a diameter to fit loosely in the holes 3, and each is provided at its outer end with a flange or annular shoulder 5 for coaction with the marginal edge wall of a hole 3 to limit the extent of insertion of a nut therein. The nut body or shank is of greater length than the thickness of the case flange to enable its free end to be projected beyond the flange and such free end is dished or countersunk, as shown at 6, to a depth preferably below the adjacent side of the case flange or within the hole 3, as shown in Fig. 3. The counter-sinking of the nut end forms a wall 7 around its edge, which wall is straight or of cylindrical form at its outer side and is preferably tapered at its inner side so that the wall broadens in thickness from its outer edge inwardly.

To secure a nut in a flange hole by my method the shank end of the nut is inserted at its limit into a hole 3 and the large or shouldered end of the nut then placed on a supporting block 8. A breaking-down or compressing pressure is then applied to the outer end of the wall 7 in opposition to the block by a ram 9, or in any other suitable manner, causing a flattening down of the wall to a level, or flush, with the adjacent surface of the flange 2 and a flowing of the displaced metal both outward and inward, as indicated by the width of the wall as compared with its original width, shown by dotted lines in Fig. 5. The outward flowing of the metal at the base of the wall 7 causes such wall to substantially fill and coact with the wall of the hole 3 to quite firmly retain the nut in the hole. The surplus outwardly flowing metal enters the angles of the hole 3 and partially fills them, or at least to a greater extent than when the nut was originally placed in the hole.

The compressing surface of the ram 9, which coacts with the wall 7, is preferably flat so that the outer flattened end of such wall will be flushed and parallel with the outer surface of the flange 2, and it is preferable to provide the ram at its central portion with a tapered projection 10, which coacts with the inner side of the wall 7 when the ram is at the limit of its compressing stroke to limit the inward flowing of the displaced metal, thereby preventing a disfiguring of the adjacent end portion of the nut thread.

Having thus described my invention, what I claim as new, and desire to secure by Letters Patent, is,—

The method of rigidly securing metal members together to prevent relative turning movements thereof, which consists in providing one member with a non-circular aperture and in providing a second member with a substantially circular stud which has a circular and inwardly tapering depression in its end face to form a ring-like edge of substantially V-cross-section, then in applying pressure to the apex of the wall to expand the latter and completely fill the opening and in arresting and limiting the inward flow of the metal just prior to the completion of the expanding movement thereof to an extent to maintain the flowed metal spaced a predetermined distance from the central part of the second member.

In testimony whereof, I have hereunto signed my name to this specification.

HUGH L. DECKER.